(No Model.) 2 Sheets—Sheet 1.
A. ELLIS.
CULTIVATOR.
No. 478,790. Patented July 12, 1892.
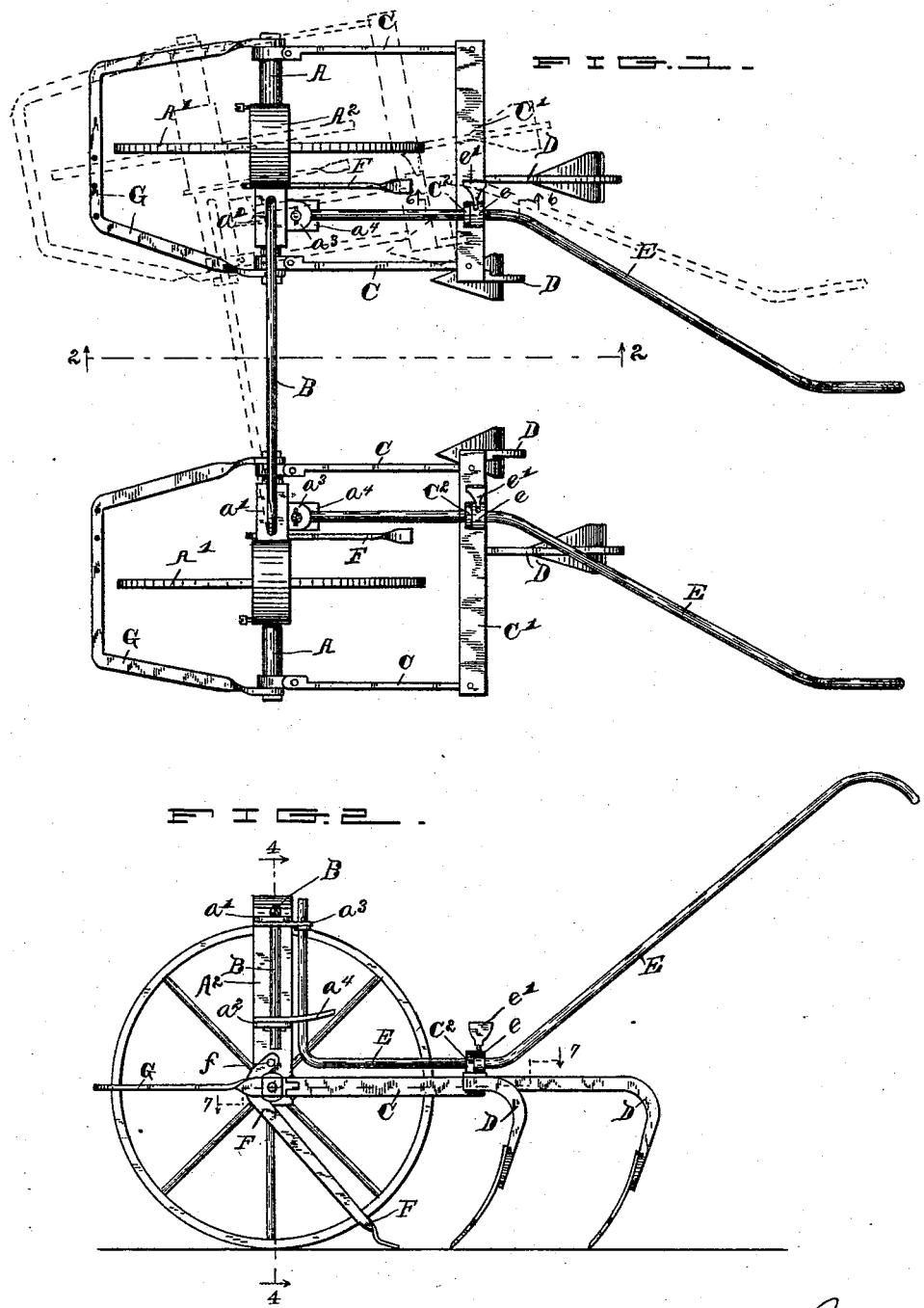
WITNESSES.
F. W. Warner
J. A. Walsh
INVENTOR.
Augustin Ellis
per C. & E. W. Bradford,
ATTORNEYS.

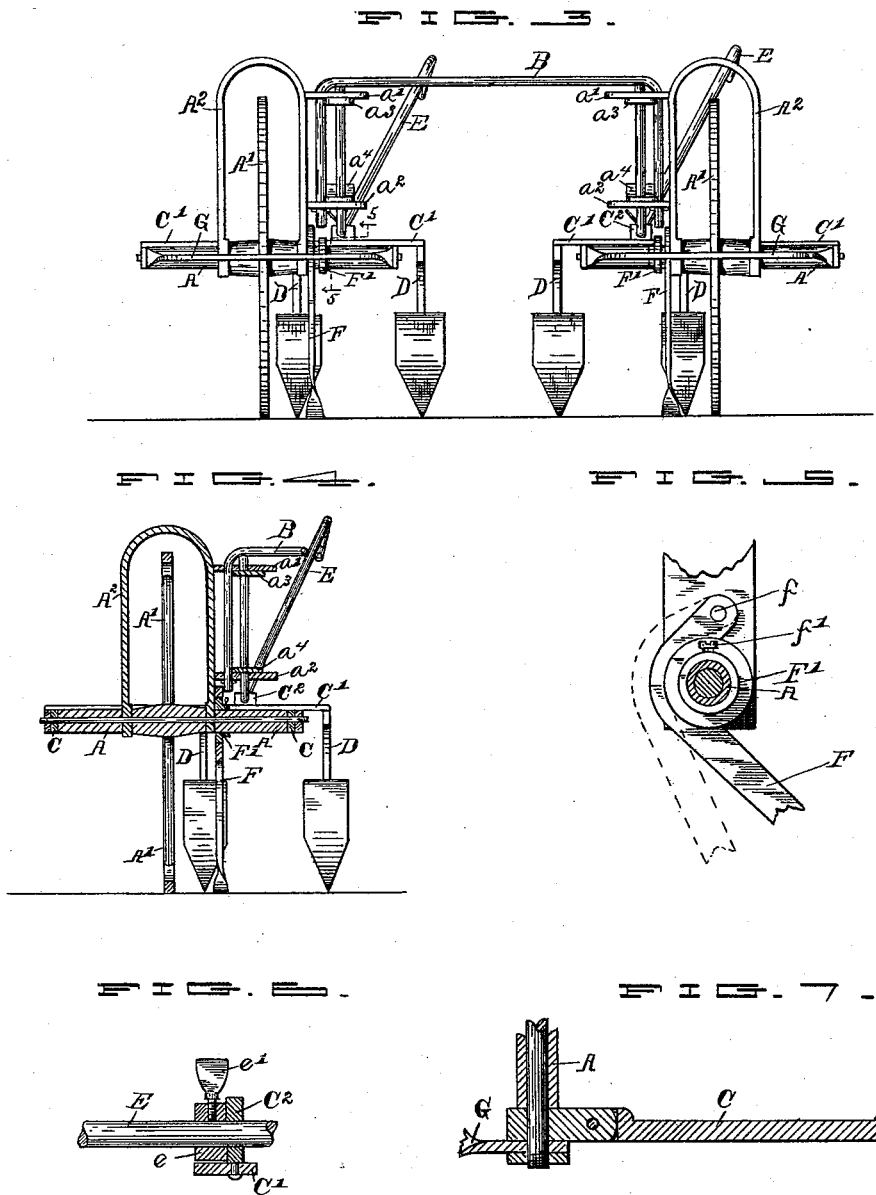

UNITED STATES PATENT OFFICE.

AUGUSTIN ELLIS, OF BEDFORD, INDIANA.

CULTIVATOR.

SPECIFICATION forming part of Letters Patent No. 478,790, dated July 12, 1892.

Application filed October 20, 1891. Serial No. 409,339. (No model.)

*To all whom it may concern:*

Be it known that I, AUGUSTIN ELLIS, a citizen of the United States, residing at Bedford, in the county of Lawrence and State of Indiana, have invented certain new and useful Improvements in Cultivators, of which the following is a specification.

My said invention relates to that class of agricultural implements known as "cultivators," and particularly to those which have arched axles; and it consists in certain improvements whereby it is enabled to do a wide range of work and be accurately adjusted for the various grades of work required of it, all as will be hereinafter more particularly described and claimed.

Referring to the accompanying drawings, which are made a part hereof, and on which similar letters of reference indicate similar parts, Figure 1 is a top or plan view of a cultivator embodying my said invention; Fig. 2, a central vertical sectional view thereof looking upwardly from the dotted line 2 2 in Fig. 1; Fig. 3, a front elevation; Fig. 4, a detail sectional view on the dotted line 4 4 in Fig. 2; and Figs. 5, 6, and 7, enlarged detail views as seen from the dotted lines 5 5, 6 6, and 7 7, respectively.

In said drawings, the portions marked A A represent the axles of the cultivator; B, the arch which connects them; C C, the plow-beams; D, the plows; E, the handles; F, the shoes, and G the draft-rods. The short axles A extend through the wheels A', which are mounted thereon, and have arch-like housings $A^2$ rigidly attached thereto, which extend up over said wheels, as shown most plainly in Fig. 3. On the sides of these housings which face each other are wings $a'$ $a^2$, through which are vertical holes which form bearings for the ends of the arch B. To these wings are also secured projections, to which the handles are connected, as will be presently described. To the outer ends of the short axles A are secured the plow-beams and draft-rods, as shown, and as will also be further described hereinafter.

The arch B, I prefer to form of a round rod, the ends of which are bent to right angles with the center and extend down through the holes in the wings $a'$ $a^2$. The two halves of the cultivator are thus connected, and such connection enables each half to move with the greatest freedom relatively to the other consistent with maintaining a position at all times equally distant from said other half. For example, either cultivator-half can advance or recede relatively to the other, or even circle around nearly in front of or behind the other, and thus by this construction shorter corners can be turned than with most others, as will be readily understood. This construction is also simple and inexpensive and not likely to get out of repair.

The plow-beams C are connected to the extreme outer ends of the short axles A and extend back horizontally to the distance required, where they are connected by cross-beams C', to which the plows are directly secured. These plow-beams are hinged near the points where they are connected to the axles and also near where they are connected to the cross-beams C', and therefore said cross-beams and the plows thereon may be carried horizontally from side to side to almost any extent required, as indicated by the dotted lines in Fig. 1, and as will be readily understood, and the plow still maintain a uniform direction to the front.

The plows D are or may be of any ordinary or well-known construction and are secured to the cross-beams C'. This peculiar arrangement of cross-beams enables a greater or less number of plows to be used, as may be desired. Two are shown on each cross-beam; but three, four, or five may be as readily used where such a number is found to be advantageous.

The handles E are secured to the projections $a^3$ on the wings $a'$ and pass down between forked arms $a^4$ on the lower wings $a^2$, and extend thence back to the rear of the plow-beams, where they are secured to the cross-beams C', and thence up to a convenient height for the user, where they terminate in handles, as usual. Near the bearings $C^2$ on the cross-beams C', through which the handles pass, collars $e$ are placed on said handles and said collars are provided with set-screws $e'$. By adjusting these collars and set-screws it is possible to accurately adjust the plows so that they shall enter the ground in operation to just a predetermined depth.

The handles are united by a loose joint to the projections $a'$, so that they may be easily moved somewhat, and therefore the plows may be lifted by means of said handles when desired.

The shoes F are secured at the upper ends by pivots $f$ to the housings $A^2$ and are bent around in front of and to below the axles and extend thence to the ground, upon which the lower ends rest, as shown. Upon the axles are mounted collars $F'$, which are adapted to slide along said axles and to be secured to any desired position thereon by means of set-screws $f'$, as shown. When these collars are moved to one side of the shoes, said shoes ride loosely upon the surface of the ground and permit the plows to enter the ground. When, however, it is desired that the plows shall be raised out of the ground, these collars are slid along said axles to under the bent portions of the shoes, which are then held outwardly, thus raising the plows out of the ground, and the cultivator is then in condition to be transported from place to place without disturbing the soil over which it passes.

As before described, a combination of the shoes in their ordinary position and the handles with their connections to the plow-beams and the adjacent collars $e$ and set-screws $e'$ are a means whereby the depth to which the plows shall enter the ground in operation may be accurately adjusted. The bringing into use of the collars $F'$ in addition serves the further purpose of raising the plows entirely free from the ground. For the various purposes, therefore, these parts are used either singly or in combination, as will be readily understood.

The draft-rods G are connected to the ends of the axles A at points immediately alongside those where the plow-beams are connected and extend forward and across in front of the wheels. They are provided with a number of orifices, to which the singletrees may be connected, to which the animals which draw the cultivator are hitched, and thus the point of draft varied at pleasure.

Having thus fully described my said invention, what I claim as new, and desire to secure by Letters Patent, is—

1. The combination, in a cultivator, of stationary axles, arch-like housings extending from said axles up over the wheels, wings on said housings, and an arch the ends whereof are substantially at right angles with its center, which ends extend down through bearings in said wings and thus unite the two halves of the cultivator, which are otherwise independent, substantially as set forth.

2. The combination, in a cultivator, of two short stationary axles, an arched axle united to said stationary axles by pivotal connections, plow-beams connected to the ends of said stationary axles, hinge-joints in said plow-beams near where they are so connected, cross-beams connecting the rear ends of said plow-beams, hinge-joints at or near the points of said connection, and plows connected to said cross-beams, whereby provision is made for a greater or less number of plows, all of which may be moved from side to side and maintain their uniform direction toward the front.

3. The combination, in a cultivator, of the axles, housings thereon, plow-beams, handles connected to said housings and extending back through bearings on said plow-beams, and adjusting-collars on said handles alongside said bearings, substantially as and for the purpose set forth.

4. The combination, in a cultivator, of the axles, the plow-beams, housings on the axles, shoes pivoted to said housings above the axles and extending around in front of and below said axles, and collars on said axles adapted to be moved longitudinally thereof to under or alongside said shoes, substantially as and for the purpose described.

5. The combination, in a cultivator, of the axles, housings thereon, plow-beams secured to said axles, handles secured to said housings and to said plow-beams, shoes also secured to said housings and passing under said axles, and adjusting-collars on said handles and on said axles, substantially as set forth.

In witness whereof I have hereunto set my hand and seal, at Indianapolis, Indiana, this 1st day of September, A. D. 1891.

AUGUSTIN ELLIS. [L. S.]

Witnesses:
CHESTER BRADFORD,
J. A. WALSH.